April 3, 1951     J. M. MARKEL     2,547,479
FOLDING ROTARY HOE
Filed Oct. 19, 1945     2 Sheets-Sheet 1
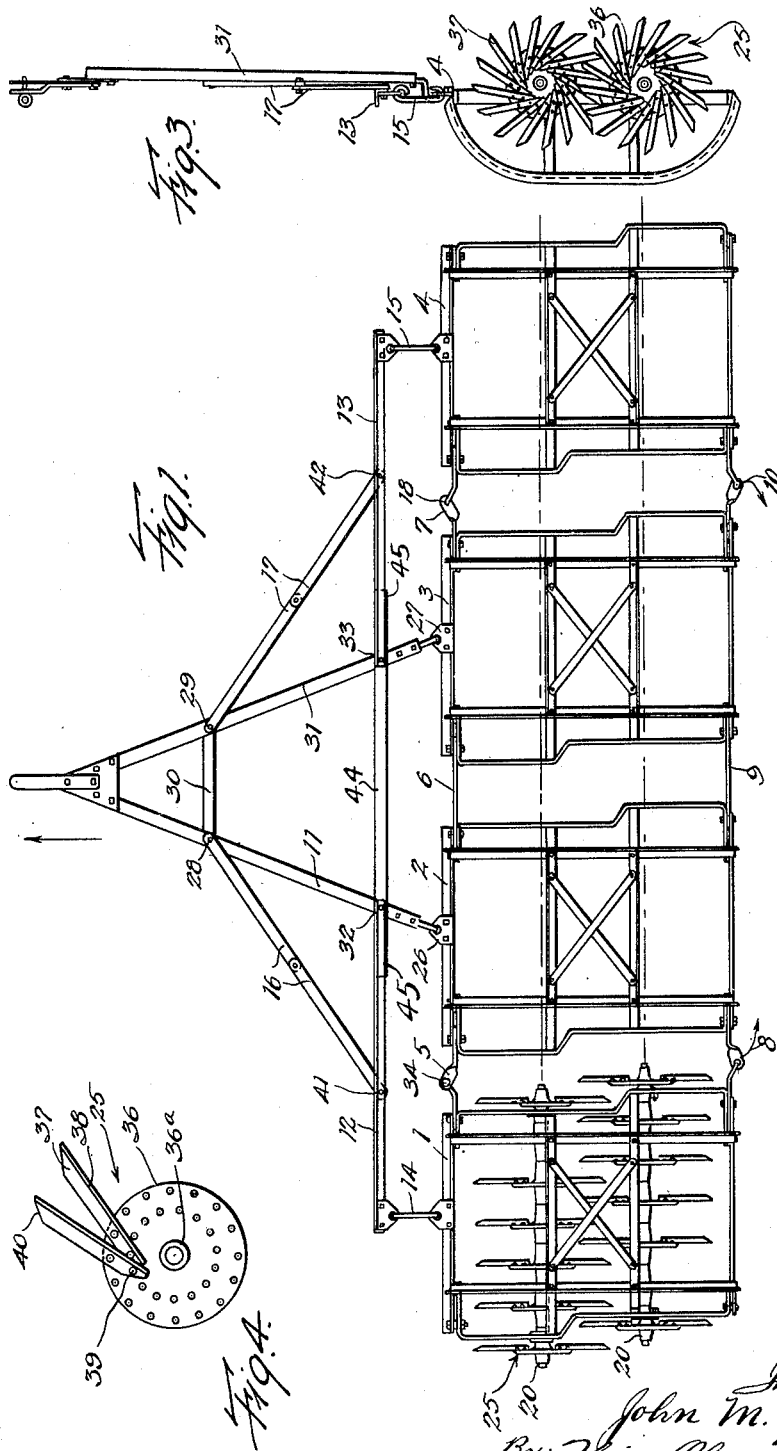
Inventor:
John M. Markel
By Thiess, Olsen & Mecklenburger
Attys.

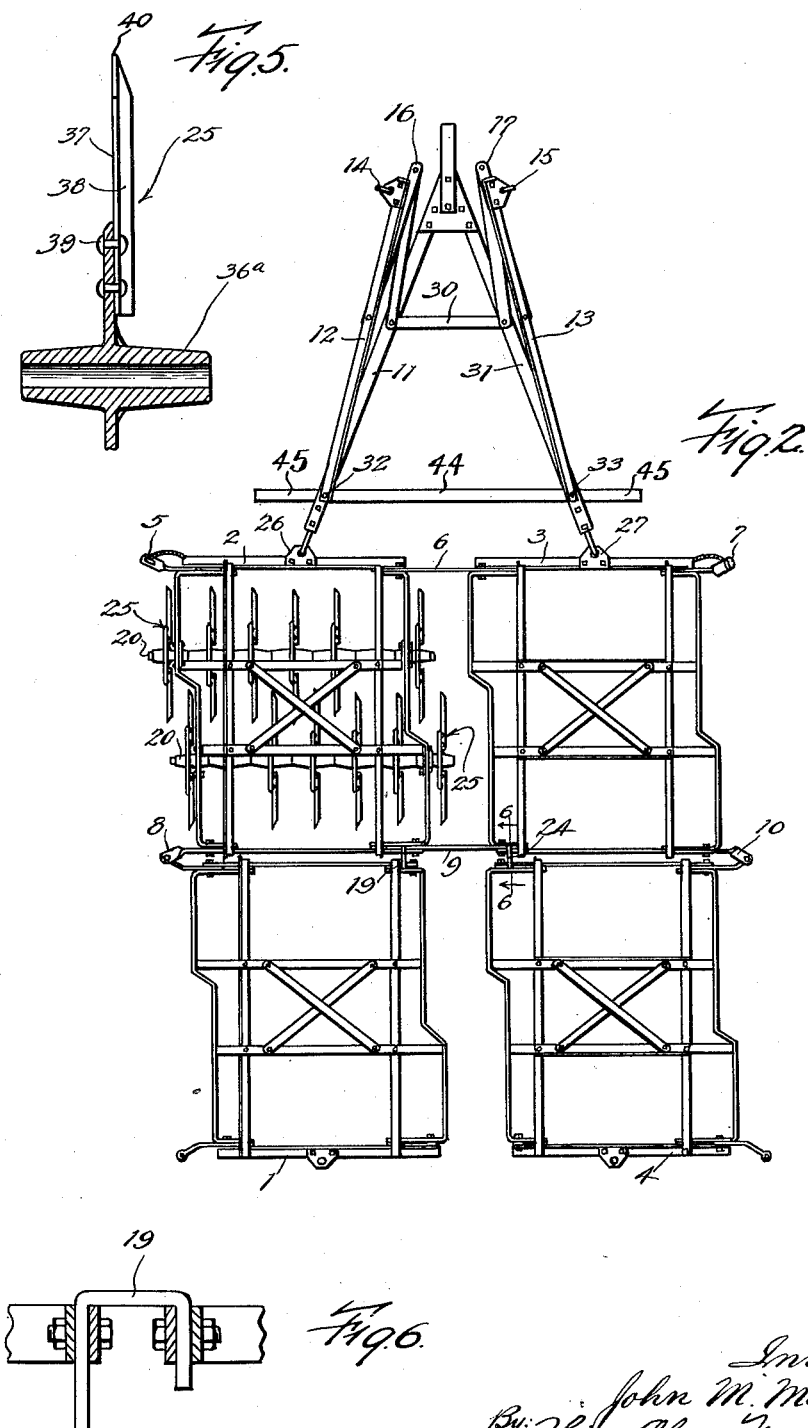

Patented Apr. 3, 1951

2,547,479

UNITED STATES PATENT OFFICE 2,547,479

FOLDING ROTARY HOE

John M. Markel, Rockford, Ill., assignor to J. I. Case Company, Racine, Wis., a corporation of Wisconsin Application October 19, 1945, Serial No. 623,324

3 Claims. (Cl. 55—11)

My invention relates to folding rotary hoes. Rotary hoes are commonly made in sections connected together at their ends so that they can float over uneven ground. The complete assembly when in position for use is in general too wide for most gates. One of the objects of my invention is to provide an improved rotary hoe in which the sections are so connected to each other and to the drawbar that certain of the frames can be partially detached from adjacent frames and swung around and connected in such a position that the assembly will pass through the ordinary gate.

A further object of my invention is to provide improved drawbar means for such a hoe which will enable the drawbar means themselves to be folded to a narrower position than the position of use.

Further objects and advantages of the invention will be apparent from the description and the claims.

In the drawings, in which an embodiment of my invention is shown,

Fig. 1 is a plan view of a four-section rotary hoe in position for use;

Fig. 2 is a plan view of the same hoe showing the two outer sections swung into position behind the two innermost sections;

Fig. 3 is an end view of Fig. 1;

Fig. 4 is a side elevational view showing a detail of one of the hoes;

Fig. 5 is an axial sectional view through one of the hoes; and

Fig. 6 is a detail sectional view showing the connection between two of the frames or sections.

Referring to the drawings, the rotary hoe shown consists of two pairs of frames 1, 2 and 3, 4. On each frame a set of two laterally spaced rotary hoes 25 is rotatably mounted on the axles 20. These rotary hoes are mounted in each frame to rotate about an axis which is transverse to the line of travel of the frame sections. Each pair of frames has a pivotal connection or joint 5, 6 and 7 which joins with the adjacent frame in a position which is proximal to the front corner. Means for detachably securing the proximal front corners of the frames together for positions of use comprise disconnecting pins 18 and 34, and means for detachably securing the normally distal rear corners together for position of transport comprise the links 19 and 24 whereby in use all four of the frames may be positioned abreast side-by-side and in transport one pair of each frame may be positioned behind the other.

Figures 3, 4, and 5 show the rotary hoe in greater detail. These wheels which are commonly called rotary hoes have teeth or fingers 38 which are mounted on a flat circular disk surface 36, as shown in Figs. 3 and 4. These fingers consist of angle irons fastened to the circular disk, by rivets or the like as shown at 39. Attached to each finger is a flange portion 37 which is chamfered at the inner end to enable extension of the fingers inwardly toward hub 36a without interference from each other. In this way a longer attaching portion and a greater spread between the rivets 39 is provided than would otherwise be possible. Flange 37 has a chamfered outer end 40 which gives the rotary hoe more efficient ground crust breaking ability.

The drawbar construction for the frames comprises a pair of rearwardly diverging drawbars 11 and 31 secured to the inside frames respectively at 26 and 27, two beams 12 and 13 pivoted at 32 and 33 to said drawbars 11 and 31, respectively, each movable from a laterally extending position to a position alongside one of said drawbars. Means comprising a pair of toggle-like links 16 and 17 pivotally connected between drawbars 11 and 12 at 28, 41 and between drawbars 31 and 13 at 29, 42 respectively, have their ends pivotally connected together by a brace 30 respectively at 28 and 29. Detachable link means 14 and 15 connect said bars with the outside sections respectively, said toggle links serving to exert draft on the means 14 and 15 through drawbars 12 and 13 when in laterally extended position. For supporting beams 12 and 13 when in laterally-extended position, a crossbar 44 is provided extending between and secured to the drawbars 11 and 13 at 32 and 33. This crossbar has lateral extensions 45 underlying the beams 12 and 13 when they are extended for supporting them.

When preparing my rotary hoe for transport, the outer frame sections 1 and 4 may each be revolved by means of the connecting joints 6 and 10 in a direction indicated by the two arrows at these joints so that section 1 is moved into position directly behind section 2, and section 4 is moved into a position directly behind section 3. To carry out this operation the disconnecting pins 18 and 34 are removed from the joints 5 and 7, and the links 14 and 15 connecting the drawbars 12 and 13 are disconnected from the frames 1 and 4. These frames are then in a position to be moved behind the respective sections 2 and 3 by means of the joints 6 and 10. When sections 1 and 4 are in their new position, hooks 19 and 24 respectively are inserted to prevent sections 1 and 4 from swinging apart during their operation. Fig. 6 shows the hook attachment.

Further modifications will be apparent to those skilled in the art, and it should be clearly understood that this invention is limited only by the scope of the appended claims.

I claim:

1. A sectional rotary hoe comprising two pairs of frames, a plurality of coaxial laterally spaced rotary hoes rotatably mounted in each frame to rotate about an axis transverse to the line of travel, the frames of each pair having a pivotal connection with each other adjacent their proximal rear corners, means for detachably securing their normally proximal front corners together for position of use, means for detachably securing their normally distal rear corners together for position of transport, whereby in use all four frames are positioned side-by-side and in transport one frame of each pair may be positioned behind the other, and drawbar means for said frames comprising a pair of rearwardly diverging drawbars secured to the two inside frames, respectively, two beams pivoted to said drawbars, respectively, each movable from a laterally extending position to a position alongside one of said drawbars, detachable means connecting said beams with the two outside sections, respectively, and tension means connecting said beams with said drawbars, respectively, for exerting draft on the beams when in extended position.

2. A sectional rotary hoe comprising two pairs of frames, a plurality of coaxial laterally spaced rotary hoes rotatably mounted in each frame to rotate about an axis transverse to the line of travel, the frames of each pair having a pivotal connection with each other adjacent their proximal rear edges, means for detachably securing their normally proximal front edges together for position of use, means for detachably securing their normally distal rear edges together for position of transport, whereby in use all four frames are positioned side by side and in transport one frame of each pair may be positioned behind the other, and drawbar means for said frames comprising a pair of rearwardly extending drawbars secured to the two inside frames, respectively, two beams pivoted to said drawbars, respectively, each movable from a laterally extending position to a position alongside one of said drawbars, detachable means connecting said beams with the two outside sections, respectively, and tension means connecting said beams with said drawbars, respectively, for exerting draft on the beams when in extended position.

3. A sectional rotary hoe comprising two pairs of frames, a plurality of coaxial laterally spaced rotary hoes rotatably mounted in each frame to rotate about an axis transverse to the line of travel, the frames of each pair having a pivotal connection with each other adjacent their proximal rear edges, means for detachably securing their normally proximal front edges together for position of use, means for detachably securing their normally distal rear edges together for position of transport, whereby in use all four frames are positioned side by side and in transport one frame of each pair may be positioned behind the other, and drawbar means for said frames comprising a pair of rearwardly extending drawbars secured to the two inside frames, respectively, two beams pivoted to said drawbars, respectively, each movable from a laterally extending position to a position alongside one of said drawbars, detachable means connecting said beams with the two outside sections, respectively, tension means connecting said beams with said drawbars, respectively, for exerting draft on the beams when in extended position, and a crossbar extending between and connecting said drawbars and having lateral extensions underlying said pivoted beams when the beams are in laterally-extended position.

JOHN M. MARKEL.

REFERENCES CITED

The following references are of record in the file of this patent:

UNITED STATES PATENTS

| Number | Name | Date |
|---|---|---|
| 634,825 | Mallon | Oct. 10, 1899 |
| 1,070,192 | Seck | Aug. 12, 1913 |
| 1,590,131 | Swanson | June 22, 1926 |
| 1,845,936 | Rude | Feb. 16, 1932 |
| 1,853,718 | Bozeman | Apr. 12, 1932 |
| 2,052,302 | Johnson et al. | Aug. 25, 1936 |
| 2,161,387 | Rodemeyer | June 6, 1939 |